J. McMASTER.
Cooking-Stoves.
No. 144,279.                              Patented Nov. 4, 1873.
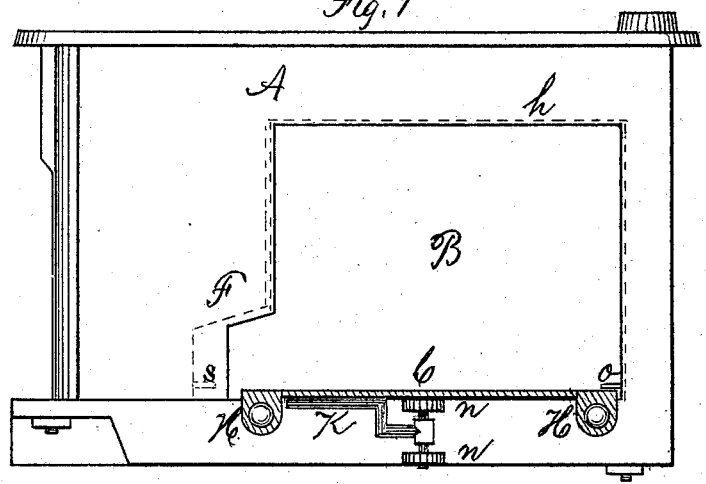
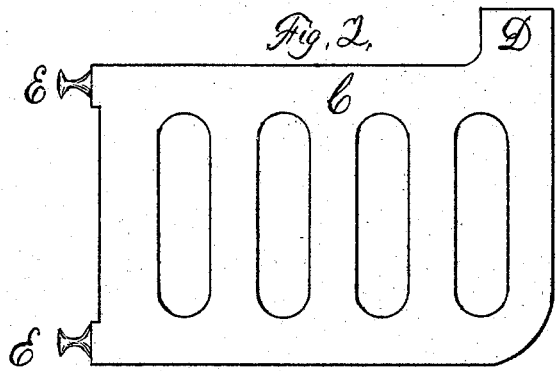
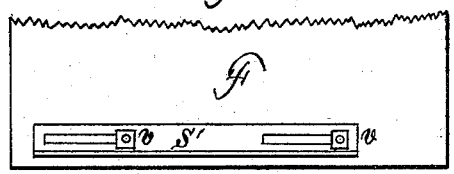

UNITED STATES PATENT OFFICE.

JOHN McMASTER, OF DAYTON, OHIO.

IMPROVEMENT IN COOKING-STOVES.

Specification forming part of Letters Patent No. 144,279, dated November 4, 1873; application filed March 4, 1872.

*To all whom it may concern:*

Be it known that I, JOHN McMASTER, of Dayton, in the county of Montgomery and State of Ohio, have invented an Oven Rack or Plate used in the Ovens of Cooking-Stoves, Ranges, &c., of which the following is a specification:

My invention relates to a plate or rack supported in the bottom of an oven by lateral ribs or other equivalent device, and also by a bracket supported externally.

Figure 1 is a side elevation of the stove. Fig. 2 is a top view of the oven-rack. Fig. 3 is a view of the front oven-plate, with an adjustable rib attached.

A represents the stove, and B the oven. The dotted lines at $h$ represent the outline of the door, which is hung to swing horizontally, and has notches cut out of its bottom for the space occupied by the ears H. The stove does not differ from those in general use, except that ribs $s$ and $o$ are cast onto the forward and rear oven-plates to support the rack or plate C when it is withdrawn from the oven. Two ears, $n\ n$, are cast on the side and bottom plates, which support the pivoted bracket K. This bracket gives additional support to the rack or plate. The ribs, or equivalent device, and bracket may be used jointly to sustain the rack, or each be used separately for the purpose. C, Fig. 2, represents the rack, which has two ears, to which the knobs E E are attached for convenience in handling, and has a projection, D, which rests beneath the rib $s$. (See dotted line, Fig. 1.) The corner opposite this projection is rounded, in order that, by first entering the projection, the rack may be carried into the oven.

Fig. 3 shows the front plate, F, of the oven, to which is bolted, by two bolts, $v\ v$, a slotted rib, $s'$, the position being that of $s$. (See dotted lines, Fig. 1.)

The object to be accomplished in using the adjustable rib is, that the rack may be withdrawn from either side of the stove, the rib being fixed nearest the side from which it is desirable to withdraw the rack.

On many stoves, in using the adjustable rib, it is only necessary to enter the rack to put it into the oven in a diagonal position, and bring the projection down within the space outside of the rib, and then, as it is withdrawn, the projection is brought beneath the rib, and thereby sustained. The projection of the rack becomes a necessity, because the oven-space in front extends back beyond the door.

The projection is dispensed with when the oven is constructed without a recess. The rack or plate would then have parallel sides, and be supported as heretofore described.

The use of the rack or plate is for the convenience afforded for examining readily, and without risk of burning the operator, any article which may be cooking or baking in an oven. This is accomplished by pulling out the rack or plate which has had the articles sought to be cooked or baked placed on it; and, further, in preparing articles for the oven by placing the vessels containing the same on the rack or plate when it is pulled out of the oven, enabling them thereby to maintain the same position that the vessels shall occupy when the rack or plate is pushed into the oven, without further handling by the operator.

I claim as my invention—

1. The oven-rack C, constructed and arranged, with reference to the oven and ribs $s$ and $o$, substantially as described.

2. The adjustable rib $s'$, constructed and arranged substantially as and for the purpose specified.

3. The bracket K, as arranged with reference to the side of the stove and the rack C, substantially as described.

JOHN McMASTER.

Witnesses:
B. PICKERING,
W. H. CLARK.